(12) United States Patent
Goodman et al.

(10) Patent No.: US 9,472,235 B2
(45) Date of Patent: *Oct. 18, 2016

(54) BULK DATA ERASE UTILIZING AN ENCRYPTION TECHNIQUE

(71) Applicant: International Business Machines Corporation, Armonk, NY (US)

(72) Inventors: Brian G. Goodman, Tucson, AZ (US); Paul M. Greco, Tucson, AZ (US); Glen A. Jaquette, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/806,603

(22) Filed: Jul. 22, 2015

(65) Prior Publication Data
US 2015/0324596 A1 Nov. 12, 2015

Related U.S. Application Data

(63) Continuation of application No. 11/841,473, filed on Aug. 20, 2007, now Pat. No. 9,111,568.

(51) Int. Cl.
| | |
|---|---|
| *H04L 29/06* | (2006.01) |
| *G06F 21/00* | (2013.01) |
| *G11B 20/00* | (2006.01) |
| *G06F 21/62* | (2013.01) |

(52) U.S. Cl.
CPC ....... *G11B 20/0021* (2013.01); *G06F 21/6209* (2013.01); *G06F 21/6245* (2013.01); *G11B 20/00086* (2013.01); *G11B 20/00253* (2013.01); *G11B 20/00275* (2013.01); *G11B 20/00666* (2013.01); *G11B 20/00876* (2013.01); *G06F 2221/2143* (2013.01); *G11B 2220/90* (2013.01)

(58) Field of Classification Search
CPC ............... G11B 20/0021; G11B 20/00253; G11B 20/00876; G11B 20/00666; G11B 20/00275; G11B 20/00086; G11B 2220/90; G06F 21/6245; G06F 21/6209; G06F 2221/2143
See application file for complete search history.

(56) References Cited

U.S. PATENT DOCUMENTS

| | | | | |
|---|---|---|---|---|
| 5,265,159 A | | 11/1993 | Kung | |
| 5,367,130 A | * | 11/1994 | Isono | ...................... G06F 3/045 178/18.02 |
| 5,406,279 A | * | 4/1995 | Anderson | ........... H03M 7/3086 341/51 |

(Continued)

OTHER PUBLICATIONS

Patent Board Decision on Appeal from U.S. Appl. No. 11/841,473, dated Jul. 31, 2014.

(Continued)

*Primary Examiner* — Lisa Lewis
(74) *Attorney, Agent, or Firm* — Zilka-Kotab, PC

(57) ABSTRACT

A system and a computer program product are disclosed for eliminating access to data on removable storage media of a removable storage media cartridge. The system comprises a computer configured to send to a data storage drive a command to eliminate access to data on a removable storage media cartridge, and send to the data storage drive a command to shred at least one key in response to the command, where shredding the at least one key eliminates access to the data on the removable storage media cartridge. A determination to eliminate access to the data on the removable storage media cartridge is based on a number of read and/or write errors encountered for the removable storage media cartridge.

20 Claims, 5 Drawing Sheets

(56) References Cited

U.S. PATENT DOCUMENTS

| | | | |
|---|---|---|---|
| 5,748,744 A | | 5/1998 | Levy et al. |
| 5,809,040 A | * | 9/1998 | Dallmann ...... G01R 31/318566 365/201 |
| 6,134,660 A | * | 10/2000 | Boneh ................. G06F 21/6209 380/201 |
| 6,574,733 B1 | * | 6/2003 | Langford ............. G06F 21/606 713/193 |
| 6,754,827 B1 | | 6/2004 | Cane et al. |
| 6,804,781 B1 | * | 10/2004 | Castro ................. G06F 21/6245 360/15 |
| 6,871,278 B1 | | 3/2005 | Sciupac |
| 6,912,634 B2 | | 6/2005 | Ripley et al. |
| 6,941,459 B1 | | 9/2005 | Hind et al. |
| 6,993,661 B1 | * | 1/2006 | Garfinkel ............ G06F 21/6245 713/164 |
| 7,346,168 B2 | | 3/2008 | Chou et al. |
| 7,363,326 B2 | | 4/2008 | Margolus |
| 7,730,541 B2 | | 6/2010 | Kawaguchi et al. |
| 9,111,568 B2 | | 8/2015 | Goodman et al. |
| 2002/0108051 A1 | | 8/2002 | Fougeroux et al. |
| 2003/0028715 A1 | * | 2/2003 | Maple ................. G11B 20/1803 711/111 |
| 2004/0125799 A1 | * | 7/2004 | Buer ................. G06F 17/30949 370/389 |
| 2005/0182951 A1 | | 8/2005 | Sohn |
| 2005/0188280 A1 | * | 8/2005 | Ali ..................... G11B 20/1883 714/42 |
| 2005/0223414 A1 | | 10/2005 | Kenrich et al. |
| 2006/0130156 A1 | | 6/2006 | Ng et al. |
| 2006/0224902 A1 | * | 10/2006 | Bolt ........................ G06F 21/10 713/193 |
| 2007/0180272 A1 | | 8/2007 | Trezise et al. |
| 2008/0034224 A1 | | 2/2008 | Ferren et al. |
| 2008/0063206 A1 | | 3/2008 | Karp et al. |
| 2008/0094215 A1 | * | 4/2008 | Amador ............. G06K 7/10366 340/572.1 |
| 2008/0141041 A1 | * | 6/2008 | Molaro ..................... H04L 9/08 713/193 |
| 2009/0049310 A1 | | 2/2009 | Carlson et al. |
| 2009/0049311 A1 | | 2/2009 | Carlson et al. |
| 2009/0052664 A1 | | 2/2009 | Goodman et al. |
| 2009/0052665 A1 | | 2/2009 | Goodman et al. |

OTHER PUBLICATIONS

IBM, "IBM 3592 Tape Cartridge," IBM information webpage, 2006, 4 pages.

Humphries, M. "Hitachi releases 200GB notebook drive," Tech Products & Geek News, May 14, 2007, 1 page.

Examiner's Answer from U.S. Appl. No. 11/841,490, dated Aug. 5, 2011.

Patent Board Decision on Appeal from U.S. Appl. No. 11/841,490, dated Oct. 29, 2014.

Examiner's Answer to Appeal Brief from U.S. Appl. No. 11/841,473, dated Aug. 3, 2011.

Examiner's Answer to Appeal Brief from U.S. Appl. No. 11/841,490, dated Aug. 5, 2011.

Final Office Action from U.S. Appl. No. 11/841,490, dated Jan. 31, 2011.

Final Office Action from U.S. Appl. No. 11/841,473, dated Feb. 1, 2011.

Non-Final Office Action from U.S. Appl. No. 11/841,490, dated Aug. 31, 2010.

Non-Final Office Action from U.S. Appl. No. 11/841,473, dated Aug. 18, 2010.

Non-Final Office Action from U.S. Appl. No. 11/841,473, dated Dec. 24, 2014.

Notice of Allowance from U.S. Appl. No. 11/841,473, dated Apr. 7, 2015.

Patent Board Decision on Appeal from U.S. Appl. No. 11/841,490, dated Jul. 31, 2014.

Swezey et al, "Safeguarding Your Data with Hitachi Bulk Data Encryption," Apr. 2007, pp. 1-2.

HGST, "Hard Disk Drive Specification: Hitachi Travelstar 7K200," May 10, 2007, pp. 1-173.

Carlson et al., U.S. Appl. No. 11/840,907, filed Aug. 17, 2007.
Carlson et al., U.S. Appl. No. 11/840,911, filed Aug. 17, 2007.
Karp et al., U.S. Appl. No. 11/470,807, filed Sep. 7, 2006.
Goodman et al., U.S. Appl. No. 11/841,490, filed Aug. 20, 2007.
Goodman et al., U.S. Appl. No. 11/841,473, filed Aug. 20, 2007.

* cited by examiner

BULK DATA ERASE UTILIZING AN ENCRYPTION TECHNIQUE

RELATED APPLICATIONS

This application is a continuation of U.S. patent application Ser. No. 11/841,473 filed Aug. 20, 2007, which is herein incorporated by reference.

BACKGROUND

This invention relates to automated data storage libraries, and more particularly, to the bulk data erase of data stored on removable media of a removable media cartridge.

Protecting and securing data is one of the primary concerns that must be addressed when designing an information management system, whether for a single user, small business or large scale data warehouse. Oftentimes, data may be continually archived on various removable storage medium, such as tape cartridges or optical disks. When archiving data on tape or other removable storage medium, one security concern is that the storage medium may be lost or stolen, especially during transport, and sensitive data on the storage medium may be discovered. Also, if the storage medium can be accessed through remote commands transmitted over a network, then there is a concern that someone may "hack" into the system, access the storage medium and then access the data.

Data on removable storage media, such as medical records, financial records or other archived information, must be kept for a certain retention period, however beyond that retention period the media that contains the data must be securely destroyed. Further, when it is detected that a particular piece of media is defective or unreliable (i.e. there are a certain number of errors detected during reading and/or writing by the data storage drive, library, or host computer), data on the defective media should be transferred to another piece of the media. The defective piece of media may still have some readable data and may need to be securely destroyed.

To protect confidential or sensitive data (e.g. credit card information, medical records, social security numbers, etc.) and to maintain customer privacy it is advantageous to perform a shredding process on certain storage media once it is no longer useful so that it is no longer accessible or recoverable. Shredding is defined herein as destroying or otherwise rendering data stored on a removable storage media permanently unreadable by any reasonable means.

Some customers may erase or overwrite the media to avoid unwanted access to the data contained on the media. To securely overwrite media, such as magnetic tape media, the entire tape should be overwritten one or more times utilizing a data pattern that contains one of logical ones, zeroes, or some combination thereof. Tape cartridges can hold up to a terabyte of information and thus, the process to erase or overwrite just one piece of media can take hours, consuming valuable resources. This burden on resources can be especially troublesome during bulk erase processes when large amounts of media must be erased.

Other customers may pay a $3^{rd}$ party to properly destroy the media by a mechanical process such as by melting, burning, or degaussing. However, this option can be very costly as well as open the removable media up to aforementioned risks during transport. In view of the foregoing, there is a need in the art for a method to securely erase and eliminate access to data on removable storage media that is both inexpensive and does not usurp valuable resources.

BRIEF SUMMARY

A system and a computer program product are disclosed for eliminating access to data on removable storage media of a removable storage media cartridge. The system comprises a computer configured to send to a data storage drive a command to eliminate access to data on a removable storage media cartridge, and send to the data storage drive a command to shred at least one key in response to the command, where shredding the at least one key eliminates access to the data on the removable storage media cartridge. A determination to eliminate access to the data on the removable storage media cartridge is based on a number of read and/or write errors encountered for the removable storage media cartridge.

BRIEF DESCRIPTION OF THE SEVERAL VIEWS OF THE DRAWINGS

Selected embodiments of the present invention may be understood, and its numerous objects, features and advantages obtained, when the following detailed description is considered in conjunction with the following drawings, in which.

DETAILED DESCRIPTION

Figure 1:
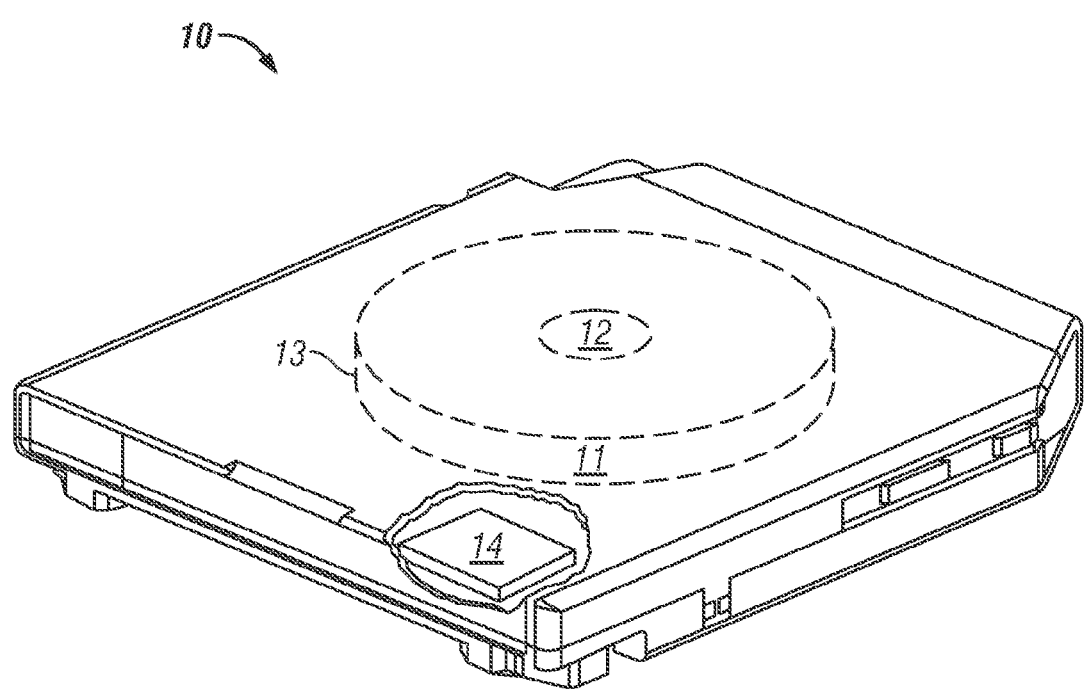
FIG. 1 illustrates a data storage cartridge with a cartridge memory and tape media.

A method, system, and a computer program product are disclosed for efficiently performing a bulk erase of data on a removable storage medium, such as a tape cartridge, by storing one or more data keys (DKs) or encryption encapsulated data keys (or externally encrypted data keys) (EE-DKs) on or about the removable media cartridge. DKs and/or EEDKs may be referred to herein simply as keys. The DK(s) and EEDK(s) can subsequently be erased to prevent any further access to the encrypted data. The shredding of the DK(s) and EEDK(s) is much quicker and a more secure process to eliminate access to data on the tape media of tape cartridge than the prior art process of overwriting the entire length of the tape media since only a much smaller portion of the media must be shredded (e.g. a few hundred bytes of information rather than up to 1 terabyte of information). It should be understood that eliminating access to data on the tape media of the tape cartridge may comprise eliminating access to some or all of the data on the tape media of the tape cartridge. Further, shredding is defined herein as destroying or otherwise rendering data stored on a removable storage media permanently unreadable by any reasonable means. Shredding may comprise erasing and/or overwriting the at least a portion of the tape one or more times utilizing a data pattern that contains one of logical ones, zeroes, or some combination thereof.

The following is intended to provide a detailed description of an example of the invention and should not be taken to be limiting of the invention itself. Rather, any number of variations may fall within the scope of the invention which is defined in the claims following the description.

Various illustrative embodiments of the present invention will now be described in detail with reference to the accompanying figures. It will be understood that the flowchart illustrations and/or block diagrams described herein can be implemented in whole or in part by dedicated hardware circuits, firmware and/or computer program instructions which are provided to a processor of a general purpose computer, special purpose computer, or other programmable data processing apparatus to produce a machine, such that the instructions (which execute via the processor of the computer or other programmable data processing apparatus) implement the functions/acts specified in the flowchart and/or block or blocks of the block diagram. In addition, while various details are set forth in the following description, it will be appreciated that the present invention may be practiced without these specific details, and that numerous implementation-specific decisions may be made to the invention described herein to achieve the device designer's specific goals, such as compliance with technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. For example, the storage device may be a tape drive, optical drive, disk drive controller, USB drive controller, and the like. The storage medium may be a tape cartridge, optical disk, disk drive, USB storage device, and the like. For simplicity, the description provided herein is provided with respect to a tape drive and a tape cartridge as the respective storage device and storage medium. One of ordinary skill in the art will recognize that these concepts apply to other storage devices and storage media. Various illustrative embodiments of the present invention will now be described in detail below with reference to the figures.

When data is to be encrypted and stored on the removable storage medium, the data is encrypted with a data key, such as by performing an AES (Advanced Encryption Standard) encryption with a randomly generated 256-bit data key. In one embodiment, the data key(s) or encrypted data key(s) are stored in multiple places on a removable media cartridge. Further, the keys in one embodiment may be stored outside of the user data area (such as in the cartridge memory and/or in specially designated non-user data areas of the storage medium that are designed for holding this type of information).

In one embodiment the DK(s) may be stored on the tape cartridge in the clear. In the clear is defined herein as a form of a message or data which is transferred or stored without encryption or cryptographic protection. One advantage of storing the data key in the clear is that any data storage drive that the removable storage cartridge is loaded into will have all the information that is needed for the encryption and/or decryption process. Therefore, neither a key manager, a key server, a key store, nor any $3^{rd}$ party component are required to perform the data access or the shredding process. This embodiment is particularly useful for bulk data erase in stand alone drives and libraries where an encryption solution has not been fully implemented. While storing the data key on the tape cartridge in the clear may not protect data on the tape cartridge, once the key is shredded data on the tape cartridge becomes inaccessible.

In another embodiment, the data key is protected by a hashing algorithm utilizing information known by, or available to, the data storage drive. A hashing algorithm is herein defined as a reproducible method which generates an address in the memory (e.g. the cartridge memory) for ordered keys. The hashing algorithm provides a way of creating a small digital "fingerprint" from any kind of data. The algorithm chops and mixes (i.e., substitutes or transposes) the data to create the fingerprint, often called a hash value. The hash value is commonly represented in hexadecimal notation. In a hashing algorithm the data storage drive contains all the information needed to perform the encryption and decryption process, the data storage drive can perform the encryption and decryption process without the requirement of a key manager, key server, or any $3^{rd}$ party component. One example of this would be a data storage drive that utilizes a cartridge serial number, or some other data that is unique to the removable media cartridge and is available to the data storage drive, to hash the data key. Another example would be a data storage drive that utilizes information unique to the data storage drive, such as a world wide name or a drive serial number, to hash the data key. This embodiment is useful for customers that require some security of their data while it is in use, but still want the ease of performing a bulk data erase in stand alone drives and libraries without requiring a full encryption solution.

In yet another embodiment, the data key may be encrypted or wrapped with a different encrypting key (a.k.a. key encrypting key) to create an EEDK, such as by using public key cryptography techniques (such as Rivest, Shamir, and Adleman (RSA) or Elliptic Curve Cryptography (ECC)), and the EEDK may be stored in one or more locations that are outside of the user data area. By encrypting the data key with an encrypting key to form an EEDK and then storing the EEDK to one or more non-user data areas on the tape cartridge, the EEDK(s) can subsequently be erased to prevent any further access to the encrypted data. Like the shredding of the DK(s), the shredding of EEDK(s) is much quicker and a more secure process to eliminate access to data on the tape media of a tape cartridge than the prior art process of overwriting the entire length of the tape media since a much smaller portion of the media must be shredded (e.g. a few hundred bytes of information rather than up to 1 terabyte of information). The above described embodiment is useful to those who require a high degree of security, have encryption capability, and would benefit from an efficient and cost-effective bulk erase.

In yet another embodiment, the data key may be securely stored in a key store. A key store is a hardware or software element that contains one or more keys for the purpose of encrypting and/or decrypting data. The key store may be located in a library, a key manager, a key server, a host computer, etc. The data storage drive either directly or indirectly has access to one or more keys in the key store. The key(s) in the key store that are associated with a particular piece of media can subsequently be erased to prevent any further access to the encrypted data. The shredding of key(s) is much quicker and a more secure process to eliminate access to data on the tape media of a tape cartridge than the prior art process of overwriting the entire length of the tape media since a much smaller portion of the media must be shredded (e.g. a few hundred bytes of information rather than up to 1 terabyte of information). The above described embodiment is useful to those who require a high degree of security, have encryption capability, and would benefit from an efficient and cost-effective bulk erase.

Figure 2:
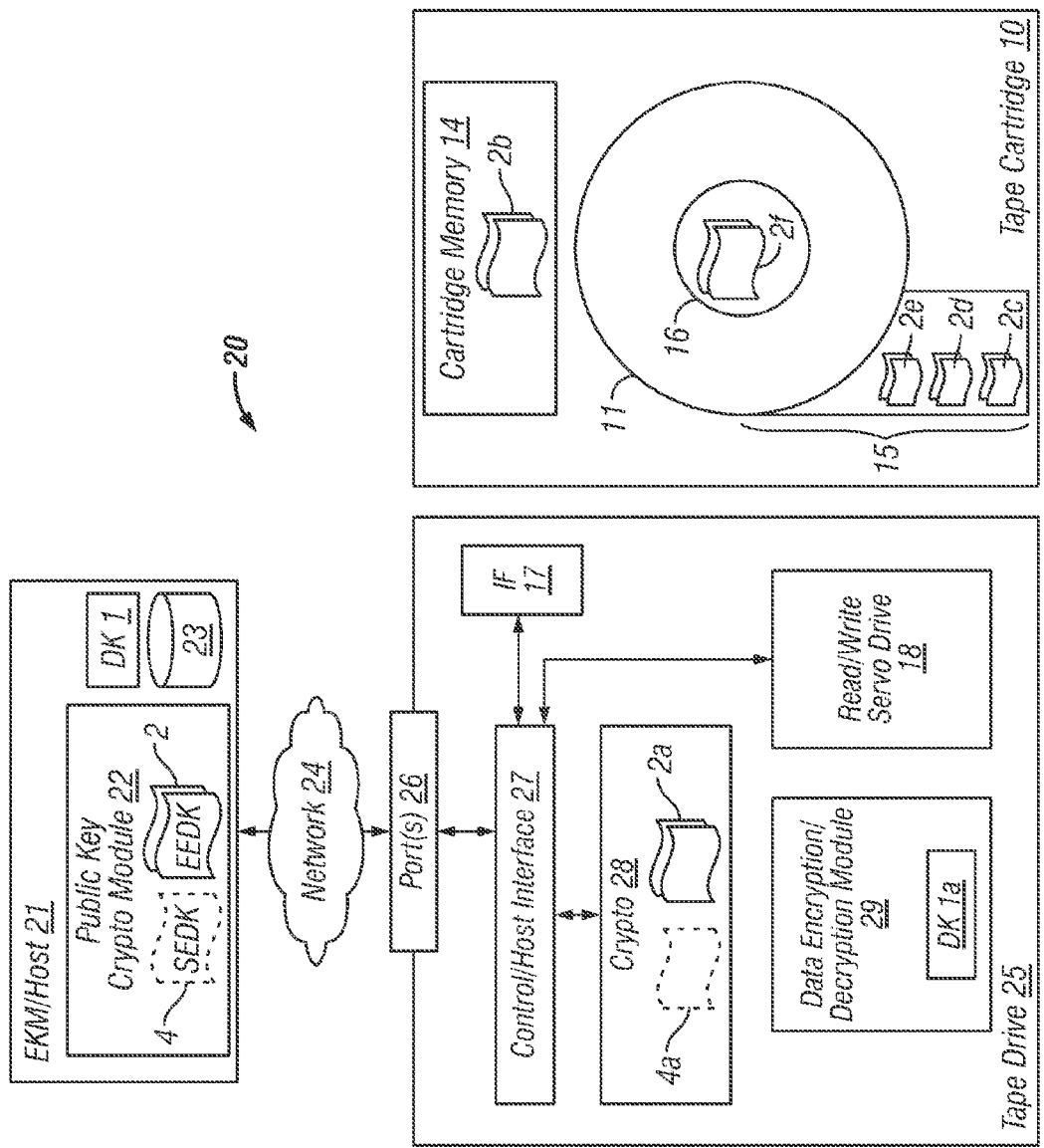
FIG. 2 is a generalized block diagram of a computing environment in which a tape cartridge and tape drive are implemented.

Referring to FIG. 1, a tape cartridge 10 is illustrated which may include a cartridge memory (CM) 14 (shown in cut-away) and tape media 11, such as a high capacity single reel of magnetic tape (shown in phantom) wound on a hub 12 of a reel 13. If present, the cartridge memory 14 may comprise electrical contacts to allow a library (not shown) and/or tape drive 25 (as seen in FIG. 2) to access the contents of the cartridge memory. Alternatively, the cartridge memory may comprise a contactless interface such as induction, radio frequency, or optical. In one embodiment, the cartridge memory 14 comprises an RFID tag. The cartridge memory 14 may be used to hold information about the tape cartridge, the tape media 11 in the tape cartridge 10, and/or data on the tape media 11. The cartridge memory 14 may also be used to store information about the tape drive that accesses the tape cartridge 10 and/or other devices or applications that may be coupled to the tape drive 25, such as a library (not shown), host computer 21, operating system (not shown), device driver (not shown), storage application software (not shown), etc. The memory may be read only, write only, read/write, or combinations thereof. For example, portions of the cartridge memory 14 may be read only while other portions are capable of being written or updated. Examples of tape cartridges are a cartridge based on LTO (Linear Tape Open) technology, such as the IBM TotalStorage LTO Ultrium Data Cartridge, and a cartridge based on IBM's 3592 technology, such as the IBM 3592 Enterprise Tape Cartridge. As will be appreciated, the tape cartridge 10 may be a magnetic tape cartridge having a dual reel implementation (in which the tape is fed between reels within the cartridge) or single reel implementation, such as illustrated in FIG. 1, in which the tape media 11 is wound on a reel 13 within the tape cartridge 10. For example, when the tape cartridge 10 is loaded into a tape drive (e.g. tape drive 25), the tape is fed between the cartridge reel and a take up reel (not shown) located in the tape drive 25. While exemplary tape cartridges based on the LTO and 3592 formats have been provided, it will be appreciated that the description is not limited by tape format. Examples of other tape formats include DLT, SDLT, 9840, 9940, T10000, AIT, and the like. While this invention is being described as using magnetic tape cartridges, it should be noted that other removable media data cartridges may be used. For example, the data storage media may comprise any type of media on which data may be stored and which may serve as removable media, including but not limited to magnetic media (such as magnetic tape or disks), optical media (such as optical tape or disks), electronic media (such as PROM, EEPROM, flash PROM, MRAM, Compactflash™, Smartmedia™, Memory Stick™, etc.), or other suitable media.

Again, for simplicity, the description provided herein is provided with respect to a tape drive and a tape cartridge as the respective storage device and storage medium. It should be understood that any removable storage medium may be used in the present embodiments. Further, the removable storage medium may comprise removable storage media for data storage (e.g. tape media) as well as a memory portion (e.g. a cartridge memory) similar to that described above.

Referring to FIG. 2, a computing environment is illustrated in which a tape cartridge 10 and tape drive 25 are implemented in combination with an external key manager (EKM) 21 as a cartridge handling system 20. It will be appreciated that the external key manager may be a host computer, another computer or controller, a key management application, or the like. The EKM 21 may also be integrated into a library controller (not shown) or a device driver (not shown), or coupled to a host (not shown). The EKM 21 may comprise hardware, such as FPGAs (Field Programable Gate Arrays), ASICs (Application Specific Integrated Circuits), discrete logic or circuits, processors, controllers, etc. In addition, the EKM 21 may comprise software, such as modules, functions, routines, code, instructions, etc.

One example implementation of such a cartridge handling system 20 would be a magnetic tape data storage system formed from the combination of an IBM 3592 Model E05 Encrypting Tape Drive and the IBM 3592 Enterprise Tape Cartridge subsystem.

In the illustrated example, the EKM/host system 21 may include a host application (not shown), such as a backup and/or archive application, that transfers data to the tape drive 25 to write to the tape cartridge 10, such as by using Small Computer System Interface (SCSI) commands to communicate I/O requests to the tape drive 25, or any other data access command protocol whether proprietary or known in the art. In addition, the EKM/host 21 may include data key generator functionality for generating a data key 1 for use in encrypting portions of the application data. Alternatively, the data key 1 may be generated by another apparatus or software. The EKM/host 21 may also include a public key crypto module 22 that is used to generate a session encrypted data key (SEDK) 4 from the data key 1, and then to securely pass the SEDK 4 to the tape drive 25 as part of a secure key exchange.

The tape drive 25 may connect with the host 21 through a direct interface (such as an SCSI, Fibre Channel, etc., in the case if the tape drive 25 is connected to the host 21) or may connect over a network 24 (such as a Local Area Network (LAN), Storage Area Network (SAN), Wide Area Network (WAN), the Internet, an Intranet, etc.). It will be appreciated that the tape drive 25 may be enclosed within the host system 21, library system (not shown), virtual tape system (not shown), some other storage system (not shown), etc. In addition, the tape drive 25 may be a standalone unit as shown in FIG. 2.

As illustrated, the tape drive 25 may include a memory circuit interface 17 for reading information from, and/or writing information to, the cartridge memory 14 of the tape cartridge 10. In addition, a read/write servo drive system 18 is provided for reading information from, and/or writing information to the tape media 11. The read/write servo drive system 18 controls the movement of a servo head (not shown) relative to the tape media 11 by moving the tape media 11 across at a desired velocity, and stops, starts and reverses the direction of movement of the tape media 11.

A controller 27 in the tape drive 25 communicates with the memory interface 17 and the read/write system servo drive 18. To receive commands and exchange information for operating the cartridge handling system 20, the controller 27 also acts as a host interface to communicate over one or more ports 26 with one or more external key management (EKM) subsystems 21 (such as a host computer, library, external key management appliance, etc.). In addition, a crypto module 28 and data encryption/decryption module 29 are provided in the tape drive 25 for securely encrypting and storing data to the tape cartridge 10 and for securely retrieving and decrypting data stored on the tape cartridge 10.

The data encryption/decryption module 29 performs the actual data encryption and decryption (such as by using the Advanced Encryption Standard encryption algorithm) using a data key having any desired key length (e.g., 128 or 256-bit data key length), and may also perform other encoding functions, such as data compression and decompression and data buffering. The crypto module 28 controls the data encryption/decryption module 29 by obtaining the keys necessary for the desired encryption. For example, in the case of encrypting application encrypted data, crypto module 28 may control the data encryption/decryption module 29 by securely exchanging the session encrypted data key (SEDK) 4a with the EKM 21. The data key 1a is extracted from the SEDK 4a at the crypto module 28 and is sent to the data encryption/decryption module 29 where the data key 1a is used to encrypt/decrypt the input data stream of application data. The crypto module 28 may also assemble, validate, distribute, store and retrieve one or more associated encryption encapsulated data keys (EEDKs) 2a as described in more detail below.

The letter suffix "a" in the reference numeral "1a" indicates that the DKs 1 and 1a, are logically identical, though physically distinct copies. Similarly, the letter suffix "a" in the reference numerals "2a" and "4a" indicates that the EEDKs 2 and 2a, and the SEDKs 4 and 4a, respectively, are logically identical, though physically distinct copies.

While the modules 28, 29 may be implemented with any desired combination of hardware and/or software, the data encryption/decryption module 29 may be implemented with an ASIC or FPGA circuit, while the crypto module 28 may be implemented with one or more drive firmware modules that include a microprocessor and firmware stored in a program memory.

As described herein, the cartridge handling system 20 may perform a variety of functions, including but not limited to, encrypting data to be stored on the tape cartridge 10 using the appropriate data key (such as an AES encryption key); using public key cryptography techniques to wrap a data key with a different key to form one or more encrypted data keys; writing and reading encrypted data and encrypted data key(s) to and from the cartridge memory 14 and/or tape media 11; and decrypting the stored encrypted data with the data key that is obtained by unwrapping the encrypted data key. The cartridge handling system 20 may provide a distributed key store which permits different users to access the encrypted data on a single tape cartridge 10 by generating separate EEDKs using each user's public key to wrap the data key 1. For example, at least a first EEDK 2 may be generated for local use by using a public key of the local key manager to wrap the data key 1, and the EEDK 2 is then transferred via the tape drive 25 (where it may be temporarily stored as 2a) for storage on the tape cartridge 10 at one or more predetermined locations, as indicated at 2b, 2c, 2d, 2e and 2f. As a result, the transferred EEDK 2 may be stored in the cartridge memory 14 and/or one or more non-user data areas of the tape media 11, such as a read-in area 15 or an end of tape area 16. Though a single copy of the EEDK 2 may be stored on the tape cartridge 10, security and reliability are enhanced by using one or more non-user areas 15, 16 of the tape media 11 to store multiple (e.g., three or more) copies of the EEDK 2, thereby allowing deletion of the EEDKs 2, 2a at the EKM 21 and tape drive 25. Since the only non-volatile copies of the EEDKs are stored within the tape cartridge 10, multiple copies of the EEDKs (2b, 2c, etc) provides multiple ways to access the EEDKs and thus the data key 1 in the cases where one or more copies of the EEDKs cannot be read or otherwise processed due to errors or degraded media or tape drive conditions.

When a plurality of EEDKs 2 are generated from a single data key 1—such as when a second EEDK is generated for a remote user (e.g., a business partner) by using a public key of the remote user to wrap the data key 1—the plurality of EEDKs 2 are transferred via the tape drive 25 for storage on the tape cartridge 10 at one or more locations (as indicated by the copies of the EEDKs 2b-f that are stored in one or more non-user data areas 15, 16 of the tape media 11 and/or the cartridge memory 14). By storing multiple EEDKs on the tape cartridge 10 in specially designated locations (such as the cartridge memory 14 or outside of the tape's user data area), the tape cartridge 10 can have one EEDK wrapped for local use and another for remote exchange. In theory, any number of different EEDKs could be stored, provided there is storage space for them.

The foregoing described embodiment wherein the different components or modules are contained within different other components or modules. It is to be understood that such depicted architectures are merely exemplary, and that in fact many other architectures can be implemented which achieve the same functionality. In an abstract, but still definite sense, any arrangement of components or modules to achieve the same functionality is effectively "associated" such that the desired functionality is achieved. Hence, any two components or modules herein combined to achieve a particular functionality can be seen as "associated with" each other such that the desired functionality is achieved, irrespective of architectures or intermedial components or modules. Likewise, any two components or modules so associated can also be viewed as being "operably connected", or "operably coupled", to each other to achieve the desired functionality.

Figure 3:
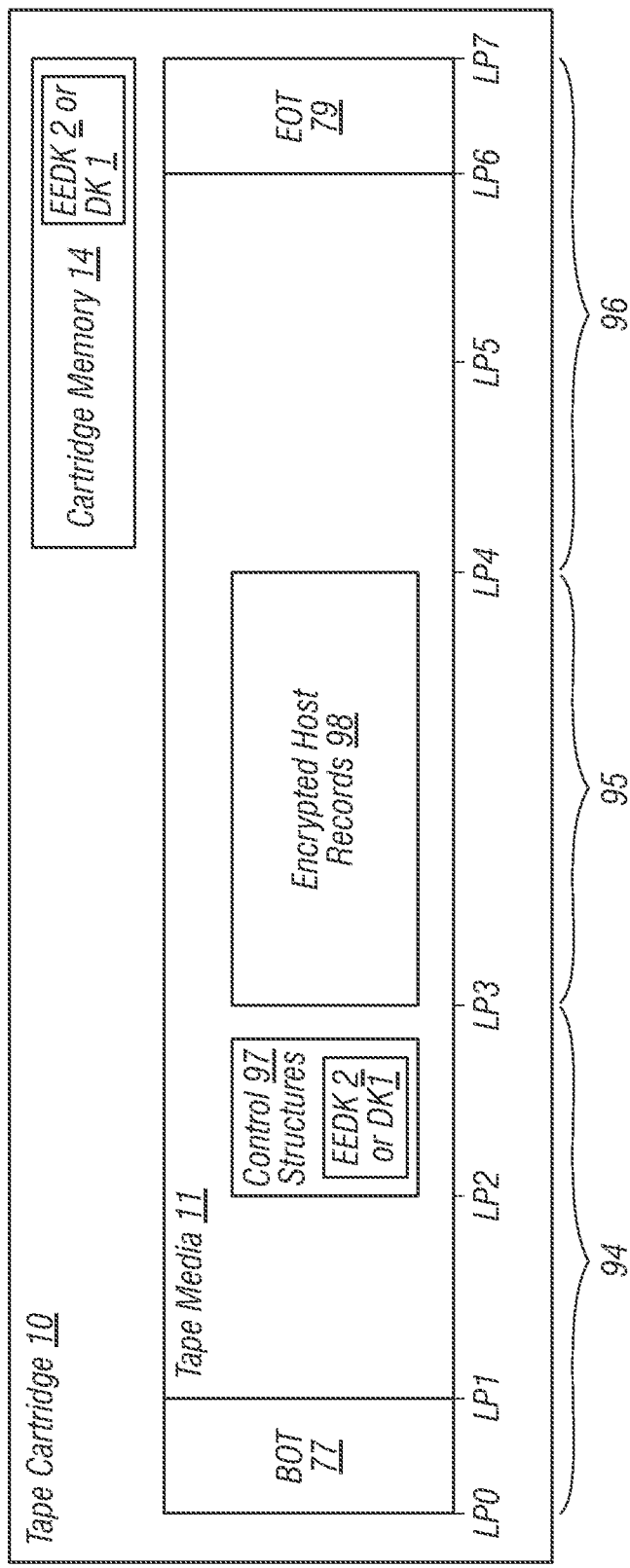
FIG. 3 is a generalized block diagram illustration of the media format elements of the tape media in a tape cartridge.

An example implementation of how EEDKs 2 are stored is illustrated in FIG. 3, which depicts a tape cartridge 10 having a cartridge memory 14 and tape media 11 and which shows the tape media format elements of the tape media 11. With reference to an illustrative implementation in which the tape medium uses an LTO tape format, the length of a tape media 11 is divided into logical points (LPs), which define bounds of regions of the tape. The regions of LP0 to LP1 and LP6 to LP7 are unused as they define the beginning of tape (BOT) region 77 and the end of tape (EOT) region 79, respectively. Additional non-user regions include the region of LP1 to LP2 (which is a servo acquisition area), the region of LP2 to LP3 (which is a calibration area that includes different information in the different bands), and the regions after LP4 (which include the servo acquisition region for reverse wraps). Thus, the tape media 11 layout includes non-user areas 94 and 96. The tape media 11 layout also includes user data regions 95 (between LP3 and LP4) in which data 98 is stored. Of course, different tape formats may be used other than LTO formats.

As illustrated in FIG. 3, the EEDKs 2 may be stored in multiple places by using the non-User Area parts of tape cartridge 10 to store the EEDKs. For example, an EEDK 2 may be stored in the cartridge memory 14. In addition or alternatively, EEDKs 2 may be stored in special non-user data set regions 94, 96 of the tape media 11 that are designed for holding this type of information, such as the tape regions before the User Data area (i.e. before LP3) or after it (i.e. after LP4). Thus, for each encrypted tape cartridge 10 stored in the tape media 11, an internal control storage area 97 is provided which allows the storage of EEDK structures 2 if this structure is provided by the external key manager.

When the EEDKs 2 are stored in non-user areas, the data key wrapping technology described herein may be used to change the access to the encrypted data by changing the access to the encrypted data key without re-encrypting the underlying data, thereby providing a variety of additional cartridge control features, such as adding an EEDK 2 to the removable media cartridge, re-keying a removable media cartridge, shredding a key for a removable media cartridge, and setting a removable media cartridge to persistently unencrypted state.

One of the objects of the present embodiment is to efficiently eliminate access to data on tape media of a tape cartridge by utilizing a data key and/or the data key wrapping technology described herein. For example, access to data on tape media of a tape cartridge may be eliminated by shredding the key. In one embodiment the key may be generated just for the purposes of performing an efficient elimination of access to data on the tape cartridge. In another embodiment the a key that has already been generated for encrypting the data for security purposes may be used to eliminate access to data on the tape cartridge.

Figure 4:
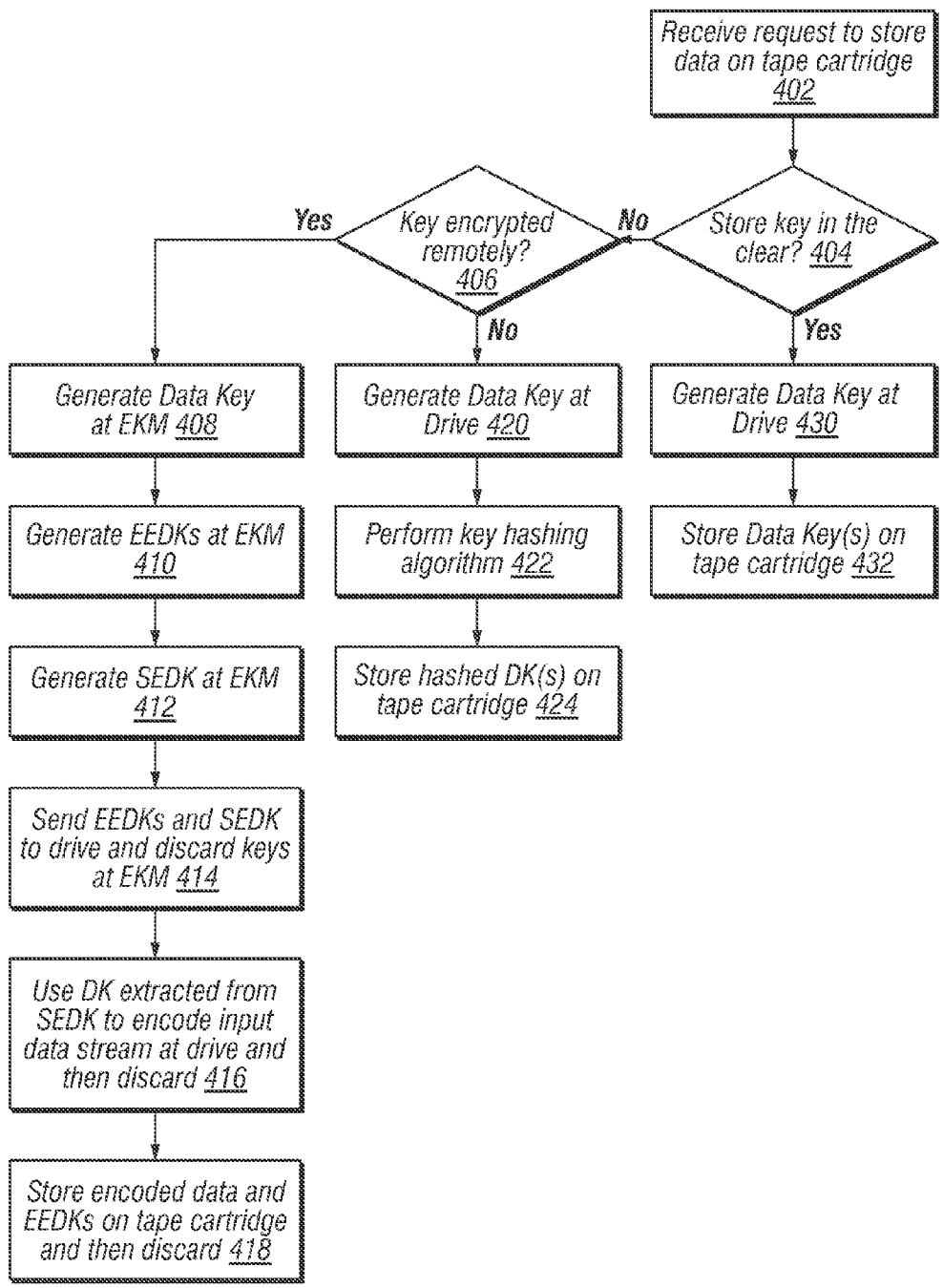
FIG. 4 is a logical flowchart of the steps used to encode a tape cartridge.

To illustrate a how to utilize a data key and/or data key wrapping technology to create a data key DK 1, 1a or an encryption encapsulated key EEDK 2 reference is now made to FIG. 4 and the cartridge handling system 20 depicted in FIG. 2.

When a request is received to store data on a tape cartridge 10 (step 402), a determination is made whether or not the data key will be stored in the clear (step 404). In the clear is defined herein as a form of a message or data which is transferred or stored without encryption or cryptographic protection.

Once it is determined that the data key will not be stored in the clear it is then determined if the key is to be encrypted by the tape drive 25 or remotely by an encryption key manager (EKM) (step 406). If it is determined that the data key will be encrypted remotely, a DK 1 is generated at the EKM 21 (step 408) and is then made available in encrypted form to the tape drive 25 before the write process begins. To this end, a secure key exchange is used to transfer the DK 1 in encrypted form to the tape drive 25 for purposes of enabling the tape drive encryption process.

While a variety of different encryption techniques may be used, an initial key generation process at the EKM 21 encrypts the DK 1 to form one or more EEDKs 2 using an encryption method, such as a pubic key cryptographic method (step 410). It is unimportant whether the encryption method is known outside of the EKM. In a selected embodiment, the EEDK creation process in the EKM 21 uses asymmetric encryption by performing RSA 2048-bit encryption of the DK 1 with the public part of a public/private key pair to render the data key 1 within the EEDK 2 completely secure to any entity who does not possess the private part of the key pair. To associate the generated EEDK(s) 2 with the public/private key pair used to encrypt the DK 1, structural information about the public/private key pair is included in each generated EEDK by the EKM 21 which can be extracted from the EEDK for future access to the data key and consequently the encrypted data itself.

At this time, a secure key exchange is established to encrypt the data key DK 1 with a session key (e.g., the public key from the tape drive 25), thereby generating a session encrypted data key 4 (SEDK) (step 412) which can be securely passed, along with the EEDK(s) 2, to the tape drive 25. Once the EKM 21 sends the encrypted data keys to the tape drive 25, the data key 1 and encrypted data key(s) 2, 4 may be discarded by the EKM 21 (step 414). As will be appreciated, there are several methodologies which may be used for secure key exchanges, including wrapping the data key 1 in a session key, though other techniques may be used, including but not limited to RSA, Diffie-Hellman (DH), elliptic curve Diffie Hellman (ECDH), Digital Signature Algorithm (DSA), elliptic curve DSA (ECDSA), etc. The session key may come from the tape drive 25 or the host 21.

Upon transfer to the tape 25, the EEDK(s) 2a and the SEDK 4a are stored in the crypto module 28. The tape drive 25 decrypts the SEDK 4a with its private session key to produce the data key 1A which is used to set up the encryption hardware module 29. At any point after the encryption hardware module 29 is set up, the SEDK 4a may be discarded from the tape drive 25 (step 416). The tape drive 25 also writes the EEDK(s) 2a to the tape cartridge 10 as part of set up or any point thereafter, and begins encrypting data using the extracted data key 1A. When writing the EEDKs 2a to the tape cartridge 10, the tape drive 25 stores multiple copies of the EEDK 2b-2f in a plurality of locations, such as one or more non-user data areas 94, 96 of tape 11 and/or in the cartridge memory 14 (step 418). In selected embodiments, the EEDKs are written to the tape cartridge 10 before the encoding or writing of data since such writing may comprise many gigabytes. Also, by recording the EEDKs first, the host system 21 that encounters an error condition can retrieve some portion of the written encoded data by using the previously stored EEDK for that encoded data. While the EEDKs 2a could be discarded from the tape drive 25 after being written to the tape cartridge 10, they may be retained in the tape drive 25 in a volatile fashion for as long as the tape cartridge 10 is loaded in the tape drive 25. Once the input data stream is encrypted and the tape drive 25 has written the encoded data to the tape media 11, the tape drive 25 discards the data key 1A (step 414). Once the encoded data and EEDK(s) 2b-2f are stored to the tape cartridge 10, the tape drive 25 discards the encoded data and the EEDK(s) 2a (step 414).

In the case where the data key is not to be stored in the clear nor is it to be encrypted remotely, the tape drive 25 generates a key to be used as the data key (step 420). The tape drive 25 may further protect the data key by encrypting the key, or by performing a hashing algorithm (step 422). This step allows the tape drive 25 to further protect the DK 1 without requiring an encryption enabled system or components such as key managers 21, key servers (not shown), key stores (not shown), a key library (not shown), or any other 3$^{rd}$ party component. In one example the tape cartridge serial number could be utilized in the encryption and/or hashing algorithm such that the tape drive 25 and/or another drive has the means to decrypt the protected DK 1. A hashing algorithm is herein defined as a reproducible method which generates an address in the memory (e.g. the cartridge memory) for ordered keys. The hashing algorithm provides a way of creating a small digital "fingerprint" from any kind of data. The algorithm chops and mixes (i.e., substitutes or transposes) the data to create the fingerprint, often called a hash value. The hash value is commonly represented in hexadecimal notation. The method of utilizing the hash algorithm has the benefits of protecting the data from unwanted invasion, while not requiring the added complexity of an encryption system. While the present example utilizes the tape cartridge serial number in the encryption and/or hashing algorithm other unique identifiers of the tape cartridge 10 or the tape drive 25 (e.g. the driver serial number, the drive ethernet Mac address, World Wide Name, etc.) could be utilized in the encryption or hashing of the data key(s), as understood by one skilled in the art. In addition, if the tape drive 25 is part of another system, such as a library (not shown), identifiers associated with other components of the system may be used in the encryption or hashing of the data key(s). For example, a library serial number, a serial number of a library component, a library Ethernet MAC address, World Wide Name, etc. could be used.

After the encryption or hashing algorithm is performed the tape drive 25 stores the protected DK(s) 1 on the tape cartridge 10 (step 424). As illustrated in FIG. 3, and similar to that described with respect the EEDKs 2, 2$a$, the DKs 1, 1$a$ may be stored in multiple places by using the non-user area of tape cartridge 10. For example, a DK 1 may be stored in the cartridge memory 14. Alternatively, DKs 1 may be stored in special non-user data set regions 94, 96 of the tape media 11 that are designed for holding this type of information, such as the tape regions before the User Data area (i.e. before LP3) or after it (i.e. after LP4). Thus, for each tape cartridge 10, an internal control storage area 97, is provided which allows the storage of DK structures 1. Further, the DK 1 may be stored in the cartridge memory 14 as well as at least one of the special non-user data set regions 94, 96 of the tape media 11.

Returning to FIG. 4, if the data key is to be stored in the clear the tape drive 25 generates a key to be used as the data key(s) (step 430). When the data key is stored on the removable storage media in the clear, any data storage drive (e.g. tape drive 25) can access the control storage area and use the clear data key DK 1 without any unwrapping operation so that the encrypted tape is now readable on any data storage drive with no requirement to acquire the data key from an entity outside the data storage drive (i.e., host or EKM 21) or to retain any particular wrapping key(s). Once the tape drive 25 generates the data key the data key is stored in the tape cartridge 10 (432) as described in step 424.

While the examples illustrated may describe customer utilizing solutions in which the data key for each and every piece of media is stored in the clear or the data key for each and every piece of media is encrypted before being stored in the media, one of ordinary skill in the art would understand that a customer may want to store some data keys in the clear while encrypting others, and yet using a hash algorithm for still others. For example customers may have data of varying confidentiality and may choose the level of security accordingly. In another example, a customer may choose to protect data by creating an EEDK 2 or utilizing a hash algorithm only when needed (e.g. before transporting the media), and yet leave the data key in the clear while it is in the customer's possession.

Although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of the processes described herein may be performed in any order practical. Further, some steps may be performed simultaneously, in parallel, or concurrently.

Additionally, it should be understood that some steps may be omitted. For example, in one embodiment the cartridge handling system 20 may be configured to store all keys in the clear because a full encryption solution is not required, such that the step of determining if the data key will be stored in the clear (step 404) may be omitted. In the aforementioned example, only steps 402, 430, and 432 may be required to be performed. Similarly, the cartridge handling system 20 may be configured to encrypt the keys remotely, such that the steps of determining if the data key will be stored in the clear (step 404) and determining if the data key will be encrypted remotely (step 406) may be omitted. In this embodiment only steps 402, 408, 410, 412, 414, 416, and 418 may be required to be performed. Finally, in the case where the cartridge handling system 20 is not configured to encrypt the keys remotely or store the keys in the clear, the steps of determining if the data key will be stored in the clear (step 404) and determining if the data key will be encrypted remotely (step 406) may be omitted. In this embodiment only steps 402, 408, 410, 412, and 414 may be required to be performed.

In another embodiment in which an external key store is employed the data key may not be encrypted at all. For example, if the communication between the tape drive 25 and the EKM 21 is considered safe or secure, then there may not be a need to encrypt the data key.

Each of the blocks of the flow diagram of FIG. 4, and those depicted in subsequent figures, may be executed by a module (e.g., a software module) or a portion of a module or a computer system user. The methods described herein, the operations thereof and modules for performing such methods may therefore be executed on a computer system configured to execute the operations of the method and/or may be executed from computer-readable media. The method may be embodied in a machine-readable and/or computer-readable medium for configuring a computer system to execute the method. The software modules may be stored within and/or transmitted to a computer system memory to configure the computer system to perform the functions of the module. Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Those skilled in the art will also recognize that the boundaries between modules and operations depicted herein are merely illustrative and alternative embodiments may merge such modules or operations, or impose an alternative decomposition of functionality thereon. For example, the actions discussed herein may be decomposed into sub-operations to be executed as multiple computer processes. Moreover, alternative embodiments may combine multiple instances of a particular operation or sub-operation. Furthermore, those skilled in the art will recognize that the operations described in exemplary embodiment are for illustration only. Operations may be combined or the functionality of the operations may be distributed in additional operations in accordance with the invention.

Figure 5:
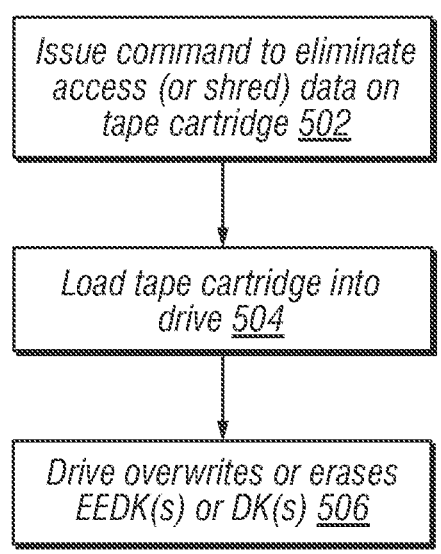
FIG. 5 illustrates a logical flowchart of the steps used to make the tape cartridge no longer accessible.

To illustrate a how to utilize a data key and/or data key wrapping technology to eliminate access to data on tape media of a tape cartridge reference is now made to FIG. 5 and the cartridge handling system 20 depicted in FIG. 2.

If it is determined that the data on tape media 11 of tape cartridge 10 should be shredded (access eliminated), a request is sent to shred data on tape media 11 of the tape cartridge 10 (step 502). The determination to eliminate access or shred the data on tape media 11 of a tape cartridge 10 may be based on a number of factors including the number of read and/or write errors for that particular tape cartridge, the age of data on the tape cartridge (e.g. expired data), a user set date for shredding the data has passed, or simple user determination that the data should be shredded.

As will be appreciated, the request to shred may be sent on the host interface from an application, utility or device management facility (i.e., via SCSI commands, etc), or may be sent over an out-of-band interface (such as from a library panel (not shown), library web interface (not shown), management console (not shown), etc.), an interface to the tape drive, or may be initiated from an encryption key manager 21 (in which case it is specified by a user to some interface in that device). The shred request may be sent to the device or module that is in control of the key(s). For example, the shred request may be sent to the tape drive 25 if the key(s) is associated with the tape cartridge 10. In another example, the shred request may be sent to EKM 21 if the key(s) is associated with the EKM 21.

In one example the request to shred may be sent by a library (not shown) under automated machine control. For example, the shred request may come from the library (not shown) when the library detects that the media has defective areas or a number of errors in read and/or write are detected. In yet another embodiment the shred request may result from manual customer control. For example, a library (not shown), host computer 21, or other system may have a selection menu (via a web-user interface or an operator panel) that allows for shredding of a tape cartridge. Further the request for the shred may be accomplished by the customer pressing a sequence of buttons on the tape drive 25.

In response to the shred request the tape cartridge 10 is loaded into the tape drive 25 (step 504). The tape may be loaded by a user, by a library (not shown), by a host computer 21, key server (not shown), or any other means of providing media to a tape drive as is known to those of skill in the art. Alternatively, in one embodiment, the tape loading of step 504 may occur prior to the shred command of step 502. For example, the shred command may occur after moving data to another cartridge as the result of an excessive amount of media errors. The tape drive 25 then shreds DK 1 or EEDK 2 from the tape cartridge 10 (step 506). The EEDKs 2 or DKs 1 can be erased from the tape cartridge 10 or the tape drive 25 may overwrite the existing EEDKs 2 or DKs 1 with invalid data. In this way, access to the data contained on tape media 11 of the tape cartridge 10 may be permanently eliminated, effectively "shredding" the data contained on tape media 11 of the tape cartridge 10.

In the case where the key is an EEDK 2, there is no need to forward the retrieved EEDKs 2 to the key manager and reacquire the data key DK 1 (though this could be done), instead the tape drive 25 could itself shred the retrieved EEDK(s) 2 from the tape cartridge 10 (step 506).

Since the EEDK 2 and DK 1 structures are the only repository for the data key needed to decrypt the cartridge data, the data may never be decrypted. When the EEDK 2 or DK 1 is stored in the CM 14, the key is in electronic form, and therefore, when the EEDK 2 and/or DK 1 is erased or overwritten there is no electronic signal that would remain. Further, when the EEDK(s) 2 and/or DK(s) 1 are stored in the cartridge memory even if the tape drive 25 can no longer read or write to the tape the cartridge memory can still be accessed and erased. Alternatively, a library, EKM 21, or other device or module may overwrite or erase the key(s) in step 506. For example, if the key(s) is associated with an EKM 21, the EKM may actually overwrite or erase the key(s).

While it has been described in the present example that the tape drive 25 performs the actual shredding of keys on the tape cartridge 10 by erasing or overwriting the data key, it should be understood by one of ordinary skill in the art that the shredding may be performed by other components or systems. For example, in another embodiment the library (not shown) could perform the shredding of keys of the tape cartridge 10. In this embodiment, the library (not shown) may comprise the means to modify the contents of the CM 14 and/or the tape media 11 without using tape drive 25. For example, the gripper (not shown) of the library (not shown) may comprise a CM reader/writer that may erase or shred the data key. Once it is determined that the tape cartridge 10 should be shredded, the library (not shown), or some other component or system may perform the shredding by erasing, overwriting, or shredding the key(s) (e.g. EEDK(s) 2, DK(s) 1, etc.).

A method, system, and a computer program product have been disclosed for efficiently performing a bulk erase of data on a removable storage medium, such as a tape cartridge, by storing one or more data keys or encryption encapsulated data keys (or externally encrypted data keys) (EEDKs) on or about the removable media cartridge. The method of storing the EEDK(s) 2 or DK(s) 1 on the CM 14 provides a more secure and efficient elimination of access to data than that of the prior art. Since the EEDK 2 and/or DK 1 are only a few hundred bytes of information of an entire terabyte cartridge the elimination of access to data can be performed more securely (e.g., using multiple erase passes with random patterns), more easily and more quickly (on the order of 2-3 minutes versus 1-2 hours) than overwriting all encrypted data on an entire tape cartridge.

In one embodiment the key may be generated just for the purposes of performing an efficient elimination of access to data on the tape cartridge. In another embodiment the a key that has already been generated for encrypting the data for security purposes may be used to eliminate access to data on the tape cartridge.

As described above, in one embodiment the data key may be stored on the tape cartridge in the clear, such that any drive (e.g. tape drive 25) will have information needed for encryption and decryption. Thus, there is no requirement to acquire the data key from an entity outside the data storage drive (i.e., host, library, EKM 21, etc.) or to retain any particular wrapping key(s) in the EKM 21, host 21, library (not shown), or any other device separate from the data storage drive. Consequently the customer's system does not require full encryption capability, and therefore the shred may be may be practiced in a library (not shown) where an encryption solution has not been fully implemented or it may be practiced by a stand alone drive. This particular embodiment is particularly useful for customers that do not require a high level of security while the tape cartridge 10 is in use, but need an efficient method of eliminating access to data, such as in a bulk data erase process when the tape cartridge 10 is no longer to be used. By storing the data key to one or more non-user data areas on tape media 11 of the tape cartridge 10, the key(s) can subsequently be erased to prevent any further access to the data on tape media 11 of tape cartridge 10.

Also as described above, in one embodiment, the data key is protected by encryption or a hashing algorithm utilizing information known by the data storage drive (e.g. tape drive 25). Thus, just as when the key is stored in the clear, there is no requirement to acquire the data key from an entity outside the data storage drive (for example from a host, library, EKM 21, etc.) or to retain any particular wrapping key(s) in the EKM 21, host 21, library (not shown), or any other device separate from the data storage drive. Consequently the customer's system does not require full encryption capability, and therefore the shred may be may be practiced in a library (not shown) where an encryption solution has not been fully implemented or it may be practiced by a stand alone drive. This particular embodiment is particularly useful for customers that require some level of security while the tape cartridge 10 is in use, but need an efficient method of eliminating access to data, such as in a bulk data erase process when the tape cartridge 10 is no longer to be used. Again, by storing the data key to one or more non-user data areas on tape media 11 of the tape cartridge 10, the DK(s) can subsequently be erased to prevent any further access to the data on tape media 11 of tape cartridge 10.

For those customers requiring a high level of security, and have encryption capability, one of the embodiments of the present disclosure provides an efficient and cost-effective bulk erase process. By encrypting the data key with an encrypting key to form an EEDK and then storing the EEDK to one or more non-user data areas on tape media 11 of the tape cartridge 10, the EEDK(s) can subsequently be erased to prevent any further access to the encrypted data on tape media 11 of tape cartridge 10.

For those customers requiring a high level of security, and have encryption capability, one of the embodiments of the present disclosure provides an efficient and cost-effective bulk erase process. By erasing or overwriting the key(s) in the key store (e.g. a key store associated with the EKM 21), any further access to the encrypted data on tape media 11 of tape cartridge 10 will be prevented.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies regardless of the particular type of signal bearing media actually used to carry out the distribution. Examples of computer readable media include recordable-type media such as a floppy disk, a hard disk drive, a RAM, and CD-ROMs and transmission-type media such as digital and analog communication links.

While particular embodiments of the present invention have been shown and described, it will be obvious to those skilled in the art that, based upon the teachings herein changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A system for eliminating access to data on removable storage media of a removable storage media cartridge comprising:
a computer configured to:
send to a data storage drive a command to eliminate access to data on a removable storage media cartridge; and
send to said data storage drive a command to shred at least one key in response to said command, wherein shredding said at least one key eliminates access to said data on said removable storage media cartridge,
wherein a determination to eliminate access to said data on said removable storage media cartridge is based on a number of read and/or write errors encountered for said removable storage media cartridge.

2. The system of claim 1, wherein said computer is configured to instruct said data storage drive to store said at least one key on said removable storage media.

3. The system of claim 2, wherein said computer is configured to instruct said data storage drive to store said at least one key on non-user portions of said removable storage media.

4. The system of claim 2, wherein said computer is configured to instruct said data storage drive to shred said at least one key by overwriting or erasing a portion of said removable storage media.

5. The system of claim 1, wherein said computer is configured to instruct said data storage drive to store said at least one key by storing said at least one key on a cartridge memory of said removable storage media cartridge.

6. The system of claim 5, wherein said computer is configured to instruct said data storage drive to shred said at least one key by overwriting or erasing at least a portion of said cartridge memory.

7. The system of claim 1, wherein said data storage drive is a tape drive and said removable storage media cartridge is a tape cartridge.

8. The system of claim 1, wherein said computer is configured to instruct said data storage drive to encrypt said at least one key.

9. The system of claim 1, wherein said computer is configured to instruct said data storage drive to protect said at least one key by a hash algorithm.

10. The system of claim 1, wherein said computer is configured to instruct said data storage drive to store said at least one key in the clear.

11. A computer program product comprising a non-transitory computer readable storage medium having program instructions embodied therewith, the program instructions executable by a processing circuit to cause the processing circuit to perform a method comprising:
causing storing of at least one key on a removable storage media cartridge, wherein said removable storage media cartridge comprises a removable storage media comprising data that is accessible with said at least one key;
receiving, by the processing circuit, a command to eliminate access to said data on said removable storage media; and
causing shredding said at least one key in response to said command, wherein shredding said at least one key eliminates access to said data on said removable storage media;
wherein a determination to eliminate access to said data on said removable storage media cartridge is based on a number of read and/or write errors encountered for said removable storage media cartridge.

12. The computer program product of claim 11, wherein said storing said at least one key comprises storing said at least one key on a non-user portion of said removable storage media, and wherein said shredding said at least one key comprises overwriting or erasing said portion of said removable storage media.

13. The computer program product of claim 11, wherein said storing said at least one key comprises storing said at least one key on a cartridge memory of said removable storage media cartridge, and wherein said shredding said at least one key comprises overwriting or erasing at least a portion of said cartridge memory.

14. The computer program product of claim 11, wherein said shredding said at least one key is performed by a data storage drive or a library.

15. The computer program product of claim 11, wherein said removable storage media cartridge is a tape cartridge.

16. The computer program product of claim 11, program instructions executable by a processing circuit to cause the processing circuit to cause encrypting of said at least one key, wherein said encrypting said at least one key on said removable storage media cartridge is performed by at least one of a data storage drive, a library, and an encryption key manager.

17. The computer program product of claim 11, wherein said at least one key is protected by a hash algorithm.

18. The computer program product of claim 11, wherein said at least one key is stored in the clear.

19. A computer program product comprising a non-transitory computer readable storage medium having program instructions embodied therewith, the program instructions executable by a processing circuit to cause the processing circuit to perform a method comprising:

generating, by the processing circuit, at least one key for a tape cartridge, wherein said tape cartridge comprises tape media comprising data that is accessible with said at least one key;

causing storing said at least one key on said tape cartridge;

sending, by the processing circuit, a command to shred said data on said tape media; and causing shredding of said at least one key on said tape cartridge in response to said command, such that said data on said tape media is inaccessible, wherein a determination to eliminate access to said data on said tape media is based on a number of read and/or write errors encountered for said tape cartridge.

20. The computer program product of claim 19, comprising program instructions executable by a processing circuit to cause the processing circuit to cause encrypting data using the at least one key, cause compressing the encrypted data, cause writing the compressed and encrypted data to the tape media, cause discarding the at least one key after storing thereof on the tape cartridge.

\* \* \* \* \*